United States Patent
Baert et al.

(10) Patent No.: US 11,149,446 B2
(45) Date of Patent: Oct. 19, 2021

(54) FLOOR PANEL COMPRISING A CERAMIC MATERIAL OR A NATURAL STONE

(71) Applicant: Champion Link International Corporation, The Valley (AI)

(72) Inventors: Thomas Luc Martine Baert, Sint-Martens-Latem (BE); Tom Van Poyer, Jiaxing (CN); Sven Boon, Jiaxing (CN)

(73) Assignee: Champion Link International Corporation, The Valley (AI)

( * ) Notice: Subject to any disclaimer, the term of this patent is extended or adjusted under 35 U.S.C. 154(b) by 0 days.

(21) Appl. No.: 16/126,725

(22) Filed: Sep. 10, 2018

(65) Prior Publication Data
US 2020/0080321 A1    Mar. 12, 2020

(51) Int. Cl.
| | |
|---|---|
| E04F 15/08 | (2006.01) |
| E04F 13/08 | (2006.01) |
| E04F 13/14 | (2006.01) |
| B32B 3/06 | (2006.01) |
| B32B 18/00 | (2006.01) |

(52) U.S. Cl.
CPC .............. *E04F 15/08* (2013.01); *B32B 3/06* (2013.01); *B32B 18/00* (2013.01); *E04F 13/0889* (2013.01); *E04F 13/142* (2013.01); *E04F 13/144* (2013.01); *B32B 2419/04* (2013.01); *B32B 2607/00* (2013.01)

(58) Field of Classification Search
CPC ....... E04F 15/08; E04F 13/144; E04F 13/142; E04F 13/0889
USPC ....................................... 52/588.1
See application file for complete search history.

(56) References Cited

U.S. PATENT DOCUMENTS

| | | | | |
|---|---|---|---|---|
| 4,153,503 A | * | 5/1979 | Booth ................ | D21J 1/00 |
| | | | | 162/123 |
| 4,327,146 A | * | 4/1982 | White ................ | B28B 1/50 |
| | | | | 428/308.8 |

(Continued)

FOREIGN PATENT DOCUMENTS

| | | |
|---|---|---|
| CN | 105873761 A | 8/2016 |
| KR | 20110031447 A | 3/2011 |
| WO | 2015105455 A1 | 7/2015 |

OTHER PUBLICATIONS

Copy with Bibliographic Data, Description, and Claims from U.S. Pat. No. 4153503 A retrieved from espacenet.com, retrieved by Examiner for Applicant's use, retrieved Jan. 2021 https://worldwide.espacenet.com/publicationDetails/biblio?CC=US&NR=4153503A&KC=A&FT=D&ND=3&date=19790508&DB=EPODOC&locale=en_EP (Year: 2021).*

(Continued)

*Primary Examiner* — Brian D Mattei
*Assistant Examiner* — Joseph J. Sadlon
(74) *Attorney, Agent, or Firm* — McCoy Russell LLP

(57) ABSTRACT

The present disclosure relates to a floor panel, comprising a laminate of a core layer, comprising a ceramic or mineral material and a binder a first pair of opposite edges, said first pair of opposite edges comprising complementary coupling parts allowing to mutually couple of plurality of floor panels to each other, a top layer, comprising a ceramic material or a natural stone, wherein the side of the core layer facing the top layer comprises a reinforcement layer, locally having a higher density than the density of the rest of the core layer.

17 Claims, 1 Drawing Sheet

(56) References Cited

U.S. PATENT DOCUMENTS

| | | | | |
|---|---|---|---|---|
| 4,397,894 | A * | 8/1983 | Haines, Jr. | B32B 27/12 428/138 |
| 4,749,609 | A * | 6/1988 | Lempereur | B32B 5/28 442/24 |
| 4,821,484 | A * | 4/1989 | Cremer | E04F 15/02405 52/793.1 |
| 4,993,208 | A * | 2/1991 | Bard | E04F 15/02 52/792.1 |
| 5,205,091 | A * | 4/1993 | Brown | E04F 15/024 52/126.6 |
| 5,640,824 | A * | 6/1997 | Johnson | E04B 7/22 52/284 |
| 5,705,250 | A * | 1/1998 | Hudson, Jr. | B65D 90/045 428/99 |
| 5,811,035 | A * | 9/1998 | Mockry | E04B 5/026 261/111 |
| 6,085,485 | A * | 7/2000 | Murdock | E04B 7/20 52/309.11 |
| 6,238,779 | B1 * | 5/2001 | Iwao | B32B 18/00 174/261 |
| 6,409,855 | B1 * | 6/2002 | Gregg | B28B 1/50 156/43 |
| 6,620,487 | B1 * | 9/2003 | Tonyan | B32B 13/04 106/735 |
| 7,211,533 | B2 * | 5/2007 | Kawada | C04B 33/24 428/209 |
| 7,442,423 | B2 * | 10/2008 | Miller | B32B 7/02 428/57 |
| 7,662,469 | B2 * | 2/2010 | Schmidt | B32B 5/245 156/324 |
| 8,096,092 | B2 * | 1/2012 | Vichniakov | B64C 1/12 52/588.1 |
| 8,196,366 | B2 * | 6/2012 | Thiers | B32B 9/042 52/403.1 |
| 8,419,877 | B2 * | 4/2013 | Pervan | E04F 15/02 156/219 |
| 8,431,054 | B2 * | 4/2013 | Pervan | B32B 21/10 264/112 |
| 8,647,749 | B2 * | 2/2014 | Norling | E04B 7/20 52/309.11 |
| 8,678,133 | B2 * | 3/2014 | Clausi | B32B 25/14 181/294 |
| 8,932,422 | B2 * | 1/2015 | de Groot | B29C 44/5636 156/196 |
| 8,993,462 | B2 * | 3/2015 | Duselis | B32B 13/02 442/131 |
| 9,032,679 | B2 * | 5/2015 | Propst | E04D 1/28 52/309.12 |
| 9,133,626 | B2 * | 9/2015 | Song | B32B 3/26 |
| 9,611,659 | B2 * | 4/2017 | Baert | E04F 15/02188 |
| 9,624,678 | B2 * | 4/2017 | Segaert | B29C 70/081 |
| 9,745,758 | B2 * | 8/2017 | Baert | E04F 13/18 |
| 9,783,995 | B2 * | 10/2017 | Meersseman | B29C 48/21 |
| 9,976,304 | B2 * | 5/2018 | Lu | B29C 43/203 |
| 10,060,139 | B2 * | 8/2018 | Pervan | E04F 15/02016 |
| 10,100,535 | B2 * | 10/2018 | Pervan | B32B 37/10 |
| 10,208,485 | B2 * | 2/2019 | Serino | E04C 2/041 |
| 10,273,693 | B2 * | 4/2019 | Zhou | E04D 5/06 |
| 10,442,152 | B2 * | 10/2019 | Schulte | B28B 1/50 428/308.8 |
| 2009/0193741 | A1 * | 8/2009 | Cappelle | E04F 15/102 52/309.1 |
| 2010/0300030 | A1 * | 12/2010 | Pervan | B32B 21/02 52/588.1 |
| 2012/0266555 | A1 * | 10/2012 | Cappelle | E04F 15/02038 52/309.1 |
| 2012/0324819 | A1 * | 12/2012 | Bryan | B32B 3/10 52/588.1 |
| 2013/0061549 | A1 * | 3/2013 | Biadora | E04B 2/06 52/503 |
| 2014/0109507 | A1 * | 4/2014 | Dossche | B32B 5/18 52/588.1 |
| 2015/0121793 | A1 * | 5/2015 | Segaert | B29C 70/081 52/506.01 |
| 2015/0343739 | A1 * | 12/2015 | Pervan | B32B 5/30 52/582.1 |
| 2016/0200092 | A1 * | 7/2016 | Doehring | E04C 2/34 52/588.1 |
| 2016/0288447 | A1 * | 10/2016 | Cordeiro | B32B 9/025 |

OTHER PUBLICATIONS

State Intellectual Property Office of the People's Republic of China, Office Action and Search Report Issued in Application No. 201910099984.6, dated Oct. 19, 2020, 17 pages. (Submitted with Partial Translation).

* cited by examiner

FLOOR PANEL COMPRISING A CERAMIC MATERIAL OR A NATURAL STONE

TECHNICAL FIELD

The present disclosure relates to a floor panel, comprising a ceramic material or a natural stone.

BACKGROUND AND SUMMARY

Installed according to the traditional methods known in the field, tiles are adhered to the substrate with mortar or adhesive. After installation, they are provided with a grout ("grouted") to provide a watertight surface that can even be applied and used in settings with standing and running water such as bathrooms. The stability and resistance to temperature and humidity fluctuations inherent to tiles allows the grout's watertightness to be permanent. The result of this traditional way of installing tiles by grouting fulfils certain needs, given its obvious benefits of waterproofness, aesthetics, and stability.

It is also clear however that tiles have certain disadvantages: the method of placing tiles is rather laborious, left only to professionals. Special equipment and skill are required, from the surface preparation and reinforcement of subfloors to support the combined weight of mortar and tile, to the layout of the tiles, and the application of a grout. For a grouted installation, a predetermined spacing is left between tiles that, in the best case, is of uniform width. This spacing is then filled with a grout of a chosen color and material, such as a mortar or epoxy. The addition of this grout imposes specific conditions to the substrate, at least a minimal weight bearing capacity, and a level of flatness. If the substrate is not prepared sufficiently, the grout or even the tile might crack under use. Once installed, a grouted floor is permanent. A tile floor becomes part of the structure, removing it requires special heavy equipment and could damage the rest of the substrate. It is not possible to re-use or repurpose tiles installed in such a way.

It is known in the field of hard surface flooring to provide the core of a flooring board such as laminates or PVC flooring with a locking mechanism. This type of installation with interlocking panels is called "floating" and provides a previously unseen ease with which a floor can be installed and uninstalled, even by the non professional or home handyman. To take away the disadvantage of tiles and allow for easy installation, removal and replacement, it has been proposed to also provide tiles' edges with this type of locking mechanism. This is however not possible to due to the tiles' inherent hardness and brittleness.

It has therefore been proposed to provide a rigid substrate with a hard surface veneer formed from ceramic, glass or stone tiles, and to provide this substrate with a locking mechanism to allow for a floating installation, amongst others in U.S. Pat. No. 7,442,423. An imitation of a grout is even proposed here, aiming to provide the look and feel of a traditional grouted tile. The proposition made by this prior art is however overly theoretical and fails to provide details on how to solve the actual challenges faced when practically realizing such a product.

Firstly, tiles will show movement in a lateral and vertical direction when the core is not absolutely stable, putting stress on the installation. This stress undermines the tile grout's structural integrity, making the installation unfit for use in wet environments. A coreboard of HDF material as suggested in U.S. Pat. No. 7,442,423 for example is known to swell or expand with up to 15% when in contact with moisture measured according to the North American Laminate Floor Association's NALFA 3.2 Laminate swelling test, thereby permanently damaging the installation. No feasible alternative materials for the envisioned base are offered. What is more, although the present disclosure mentions a "rigid and stable core", the substrate panel will still independently change in dimension under temperature changes, as indicated in the present disclosure.

It is known in the floating flooring industry to provide as base, instead of a lignocellulose or wood fiber-based core such as HDF or MDF, alternative substrates based on a polymer such as PP, PE, PVC, PU etc. These are known in the industry to be readily available alternatives, commonly in use for engineered products combining different layers of plastics. It is possible for example to provide a foamed low density core or a high density solid core, common substrates in the laminate and plastic flooring industries. The materials proposed in the art are however unsuited for the intended purpose, as the physical property of lignocellulose or plant-based materials is that they move under humidity, of plastics that they move under temperature fluctuations. No specific method of solving this issue is provided.

Secondly, the dimensional changes also put stress on the tile itself. The flexural strength of ceramic, porcelain and stone tiles is so that slight stress can lead to surface crazing (multiple hairline fractures) and breakage. To illustrate, when glued on a 4 mm solid PVC substrate of 2000 kg/m3, a 4.8 mm marble tile showed breaking when heated up from 23 C to 60 C, temperatures easily reached in living environments, for example in a sunroom or behind a window.

Thirdly, the prior art claims that a substrate with lower weight than the top layer is beneficial for transportation, installation and the environmental. An HDF is proposed to be used as substrate, of a uniform density of around 850 kg/m3. As the density of a ceramic tile is around 2200 kg/m3, a solid stone around 2800 kg/m3, a porcelain around 2400 kg/m3 or higher, significant reductions in weight versus traditional solid stone or ceramic tiles can be achieved. However, when combined with a substrate of uniform density such as HDF, the impact and indentation resistance of the ceramic tile are insufficient to support commercial, or even normal residential, use. Tiles tend to fracture or show crazing when subjected to higher pressure, especially localized pressure such as the pressure generated by high heels, because the substrate does not provide sufficient support to the top layer, especially when the top veneer is of thinner dimensions.

Details on how to create a stable and rigid core that is viable for use, and a feasible structure that is usable for the intended purpose lack. As a result, there is still no commercially available product in the market today, illustrating the shortcomings of the current state of the field.

Prior art documents describe embodiments where a fiberglass layer is added in between the top and core layers. This is mainly meant to provide some safety when the top layer breaks, not to prevent the top layer from breaking, nor to increase or improve the stability of the core layer. The impact of addition of this layer on stability is also minimal due to the positioning of the fiberglass layer outside of, not inside, the core layer.

It is therefore a purpose of the current disclosure to provide a substrate panel that takes away at least some of the shortcomings of the prior art, or at least provides a useful and viable alternative to the prior art.

It is therefore a purpose of the present disclosure to provide a core layer comprising MgO, Mg(OH)$_2$, MgSO$_4$, MgCl$_2$, CaCO$_3$, as ceramic or mineral material. These preferred materials show less or no expansion or contraction due to moisture or temperature fluctuations, to this end the mineral or ceramic content of the core layer is preferably at least 80%, and better results may be obtained with around at least 85% mineral or ceramic content. These core materials have—unlike plastic components—neither known nor assumed—disadvantages on people's health. It is known that HDF contains large quantities of melamine urea formaldehyde, a thermosetting resin which poses concerns for human health and the environment as these resins are not degradable, while its waste management releases harmful toxins into the environment; thermoplastic alternatives likewise raise questions about sustainability.

BRIEF DESCRIPTION OF DRAWINGS

The invention will be further explained with reference to the appended figures.

DETAILED DESCRIPTION

Figure 1:
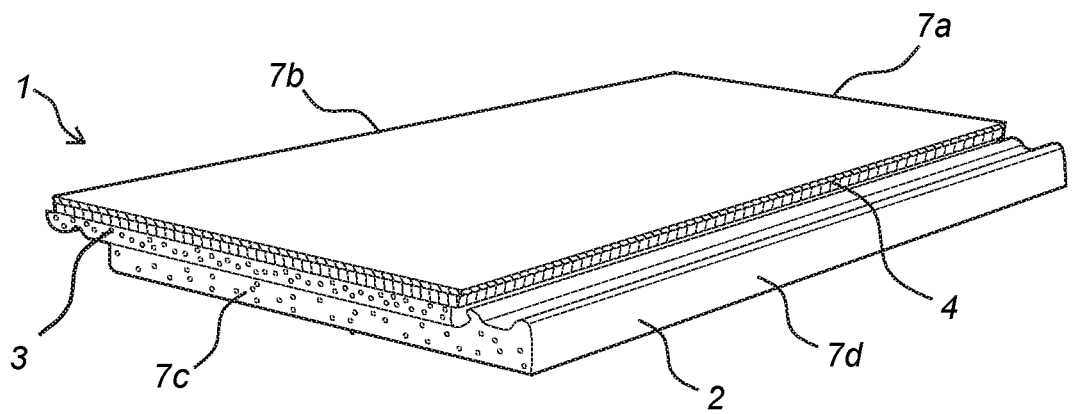
FIG. 1 shows in perspective a preferred embodiment of the panel according to the invention.

FIG. 1 shows a panel 1 suitable for assembling a floor or wall covering by interconnecting a plurality of said panels with each other, at least four substantially linear side edges 7a, 7b, 7c, 7d comprising at least one pair of opposite side edges 7a, 7c said pair of opposite edges comprising complementary coupling parts allowing to mutually couple a plurality of floor panels to each other, the panel 1 comprising a core layer 2, comprising a ceramic or mineral material and a binder, a top layer 4 comprising a ceramic material, a tile, a porcelain ceramic, or a natural stone. The side of the core layer 2 facing the top layer 4 comprises a reinforcement layer 3, locally having a different density than the density of the rest of the core layer 2. It is conceivable that the panel 1 comprises a fibre mesh located near the surface of the reinforcement layer 3.

Figure 2:
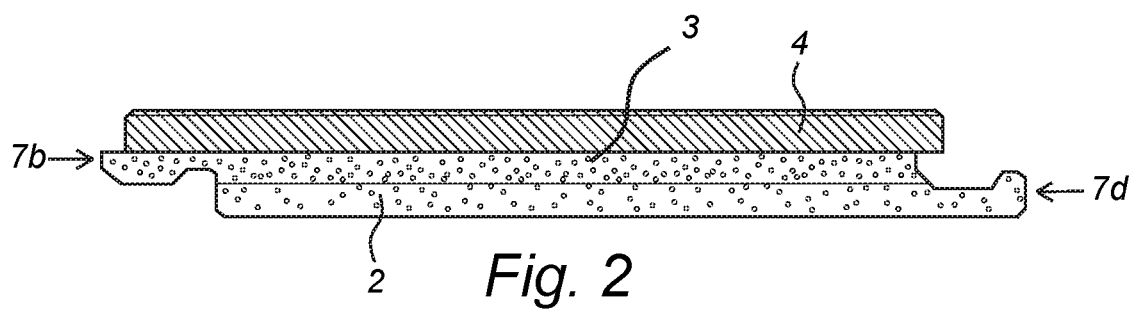
FIG. 2 shows a cross section of a possible embodiment of the panel according to the invention.

FIG. 2 shows a cross sectional view of an embodiment of a panel 1 according to the invention. The panel 1 includes a pair of opposite side edges 7b, 7d each comprising complementary coupling parts allowing to mutually couple a plurality of floor panels to each other. The side of the core layer 2 facing the top layer 4 comprises a reinforcement layer 3, locally having a different density than the density of the rest of the core layer 2.

The present disclosure provides a floor panel, comprising a laminate of a core layer, comprising a ceramic or mineral material and a binder, a first pair of opposite edges, said first pair of opposite edges comprising complementary coupling parts allowing to mutually couple of plurality of floor panels to each other, a top layer, comprising a ceramic material or a natural stone, wherein the side of the core layer facing the top layer comprises a reinforcement layer, locally having a higher density than the density of the rest of the core layer.

The current disclosure herewith provides extra support to the top layer. This localized higher density improves impact resistance and prevents the breaking of the top layer. This higher density layer may optionally be reinforced with a fiberglass layer that is locally incorporated within the substrate material and is located nearby the top surface of the support layer. Any other fiber layer of similar physical properties may of course also be considered.

The reinforcement layer may be interpreted as a higher density top layer, or a crust layer, that can be formed in an extrusion process, with the top and/or bottom surfaces being increased in density through a cooling process, or deposited in layers to the substrate in form of a slurry of differing density and then dried, or added in layers of different density. Preferably its density is at least 5% higher than the rest of the core, more preferably more than 10% higher, and even more preferred more than 20% higher.

The present disclosure herewith provides a ceramic tile with an interlocking mechanism on the sides that can be installed as a floating floor, that is able to withstand impacts, stresses in transportation, fluctuations in humidity and temperature, and is suitable for use in commercial settings.

In general, according to the present disclosure, a top layer with a thickness between 1 and 10 mm is preferred according to the present disclosure, and a core with a thickness between 2 and 10, and preferably about 6 mm is preferred. A total product thickness of 8-15 mm is further preferred. Good stability results under fluctuations in humidity and temperature were obtained with an 8 mm MgO-based board with an overall density of 1200 kg/m3 and a crust of 1600 kg/m3 density of 2 mm thick near the top surface and reinforced with a fiberglass mesh. It is of course possible to change the fiberglass to a natural fibre to achieve a completely plastic-free construction, or to add more reinforcing layers, such as near the bottom surface of the panel, to attune total stability of the board. Yet a further improvement can be obtained by applying at least one reinforcing fiberglass mesh, but preferably two such layers, with a second near the bottom surface of the panel, preferably incorporated in the reinforcing layer: in this embodiment dimensional stability after 24 hr submersion in water was proven to be limited to 0.03% length- and width-wise, and a thickness swelling of less than 0.01% was noted when measured according to NALFA 3.2. The expansion rate from 23 C-60 C was 0%, contraction after heating up to 80 C measured according to ISO 23999 was measured to be 0%.

The complementary coupling parts may in particular comprise a click-coupling, that is a coupling that snap-fits when two tiles are engaged against each other. Addition of a small quantity of lignocellulose fibers to the core adds sufficient elasticity to the locking mechanism necessary to allow for a smooth engagement of the lock. The lignocellulose content is however preferably less than 15%, and most preferably less than 10%, to avoid swelling under conditions of moisture and issues with mold or fungus. Satisfactory results that obtained a fungus resistance of grade 0 (no fungus growth) when measured according to ASTM G21—Standard Practice for Determining Resistance of Synthetic Polymeric Materials to Fungi were obtained with a lignocellulose content of around 9%. A lignocellulose content above 8% is preferred in order to obtain enough flexibility for coupling parts that need to bend for a click.

It is known in the art to further provide a bio-ceramic material coating to a core layer for antifungal and deodorizing effects. This is necessary as lignocellulose or plant-based panels are sensitive to mold or fungus growth. Plastic-based substrates are also sensitive to mold or fungus growth due to the addition of vinylizers or plasticizers, which serve as nutrition to fungus. A regular vinyl or PVC flooring containing plasticizers rates around grade 1-2 (slight growth of fungus) when tested according to ASTM G21. The current disclosure proposes a mineral or ceramic substrate comprising or even being substantially made of MgO, $Mg(OH)_2$, $MgSO_4$, $MgCl_2$, $CaCO_3$ or alternative materials of similar properties that is, as a result, naturally antifungal when tested to ASTM G21 with a result of grade 0 (no fungus growth).

In a further embodiment of the present disclosure, the surface area of the top layer is smaller than the surface of the core layer. When assembling a floor from these panels, the impression of a grout is given, formed by the uncovered and thus visible parts of the core layer. The spacing created is consistent and easily maintained due to the prefabricated nature of the panels. It is possible to then grout this spacing with mortar or an epoxy grout if required, or to use the substrate as an imitation grout. In this case, the substrate is preferably level with the top layer on at least two sides, with the imitation grout on at least one side. It is possible to manufacture a grout with a certain color for aesthetic effect, or to add a color in the manufacturing process, or to add a finish with a certain color to the surface of the grout.

An additional backing layer may further be present at the side from the core layer facing away from the top layer, having acoustic dampening properties. To this end, a low density layer can be considered of at least 85 kg/m3, preferably more than 130 kg/m3, such as with a foam structure in which closed or open cells are present. This foam structure is typically obtained by adding blowing agents to a melt, before it is formed and hardened into the final shape. Common in the field are foamed layers basically composed of ethylene vinyl acetate, irradiation cross-linked polyethylene or similar alternative materials such as polyvinyl chloride. Out of environmental considerations, natural options such as a cork layer or a layer of recycled PET (polyethylene terephthalate) could be considered. Another benefit of this sound-dampening layer is the absorption and levelling of substrate irregularities, even further reducing the chance of a breaking top layer.

The invention claimed is:

1. A floor panel adapted for assembling a floor or wall covering, the floor panel comprising:
   a core layer comprising a ceramic or mineral material and a binder, wherein the core layer comprises the ceramic or mineral material in an amount such that the core layer resists expansion or contraction due to moisture or temperature fluctuations;
   at least one pair of opposite edges, said pair of opposite edges comprising complementary coupling parts allowing to mutually couple a plurality of floor panels to each other; and
   a top layer, comprising a ceramic material, a tile, a porcelain ceramic, a natural stone, or a mosaic,
   wherein a side of the core layer facing the top layer comprises an integrally formed reinforcement layer, locally having a higher density than a density of the rest of the core layer, the reinforcement layer being deposited in at least one layer to the core layer, and wherein the reinforcement layer is an area of higher density incorporated within the core layer located near the side of the core layer facing the top layer.

2. The floor panel according to claim 1, wherein the reinforcement layer has a density that is at least 5%, 10%, or 20% higher than the density of the rest of the core layer.

3. The floor panel according to claim 1, comprising a fibre mesh located near a surface of the reinforcement layer.

4. The floor panel according to claim 1, wherein the reinforcement layer is a crust layer.

5. The floor panel according to claim 1, wherein the core layer has a lower density than the top layer.

6. The floor panel according to claim 1, wherein the complementary coupling parts comprise a click-coupling.

7. The floor panel according to claim 6, wherein a mineral or ceramic content of the core layer is at least 50%, at least 75%, or at least 85%.

8. The floor panel according to claim 1, wherein the core layer comprises at least one of MgO, $Mg(OH)_2$, $MgSO_4$, $MgCl_2$, and $CaCO_3$ as the ceramic or mineral material.

9. The floor panel according to claim 1, wherein the core layer comprises lignocellulose as the binder between 8% and 15% or at 9% or 10%.

10. The floor panel according to claim 1, wherein the top layer comprises a stone veneer or a porcelain tile.

11. The floor panel according to claim 1, wherein the top layer has a thickness between 1 and 12 mm and the core layer has a thickness between 2 and 10 mm or 6 and 8 mm.

12. The floor panel according to claim 1, wherein a surface area of the top layer is smaller than a surface area of the core layer.

13. The floor panel according to claim 1, wherein on at least one side the core layer is visible to imitate grout.

14. The floor panel according to claim 1, wherein a grout can be applied for a waterproof installation.

15. The floor panel according to claim 1, wherein at least one part of the core layer that is not covered by the top layer has a pre-applied finish to imitate grout.

16. The floor panel according to claim 1, wherein a backing layer is present at a side of the core layer facing away from the top layer, having acoustic dampening and levelling properties.

17. A panel adapted for assembling a floor or wall covering, the panel comprising:
   a core layer comprising
      a ceramic or mineral material and a binder, wherein the core layer comprises the ceramic or mineral material in an amount such that the core layer resists expansion or contraction due to moisture or temperature fluctuations; and
   at least one pair of opposite edges, said pair of opposite edges comprising complementary coupling parts allowing to mutually couple a plurality of floor panels to each other; and
   a top layer, comprising a ceramic material, a tile, a porcelain ceramic, a natural stone, or a mosaic,
   wherein a side of the core layer facing the top layer comprises an integrally formed reinforcement layer, locally having a different density than a density of the rest of the core layer, the reinforcement layer being deposited in at least one layer to the core layer, and wherein the reinforcement layer is an area of higher density incorporated within the core layer located near the side of the core layer facing the top layer, wherein the reinforcement layer has a density that is higher than the density of the rest of the core layer, wherein the reinforcement layer has a density that is at least 5%, 10%, or 20% higher than the density of the rest of the core layer, wherein a floor panel comprising a fibre mesh is located near a surface of the reinforcement layer and/or wherein the reinforcement layer is a crust layer, and/or wherein the core layer has a lower density than the top layer; and/or wherein the complementary coupling parts comprise a click-coupling, and/or wherein the core layer comprises MgO, $Mg(OH)_2$, $MgSO_4$, $MgCl_2$, $CaCO_3$ as the ceramic or mineral material, wherein a mineral or ceramic content of the core layer is at least 50%, 75%, or 85%, and/or wherein the core layer comprises lignocellulose as the binder between 8% and 15% or 9% and 10%, and/or wherein the top layer comprises a ceramic, a natural stone, a stone veneer, a mosaic, or a porcelain tile, and/or wherein the top layer has a thickness between 1 and 12 mm and the core layer has a thickness between 2 and 10 mm or 6 and 8 mm, and/or wherein a surface area of the top layer is smaller than a surface area of the core layer; and/or wherein on at least one side the core layer is visible to imitate grout, and/or wherein a grout can be applied for a waterproof installation, and/or wherein at least one part of the core layer that is not covered by the top layer has a pre-applied finish to imitate grout, and/or wherein a backing layer is present at a side of the core layer facing away from the top layer, having acoustic dampening and levelling properties.

* * * * *